US 9,821,841 B2

(12) United States Patent
Weekley et al.

(10) Patent No.: US 9,821,841 B2
(45) Date of Patent: Nov. 21, 2017

(54) DUAL BORE INTEGRATED STEERING ASSIST

(71) Applicant: HB Performance Systems, Inc., Mequon, WI (US)

(72) Inventors: Rod Weekley, Mequon, WI (US); Patrick Schwobe, Mequon, WI (US); Peter E. True, West Bend, WI (US); Tim Osterberg, Mequon, WI (US); Kurt Person, Cedarburg, WI (US)

(73) Assignee: HB PERFORMANCE SYSTEMS, INC., Mequon, WI (US)

( * ) Notice: Subject to any disclaimer, the term of this patent is extended or adjusted under 35 U.S.C. 154(b) by 132 days.

(21) Appl. No.: 14/925,689

(22) Filed: Oct. 28, 2015

(65) Prior Publication Data
US 2017/0120950 A1    May 4, 2017

(51) Int. Cl.
*B62D 5/06* (2006.01)
*B62D 5/12* (2006.01)
*B62D 3/12* (2006.01)

(52) U.S. Cl.
CPC ...... *B62D 5/12* (2013.01); *B62D 3/12* (2013.01)

(58) Field of Classification Search
CPC ...................................................... B62D 5/22
USPC ........................................................ 180/427
See application file for complete search history.

(56) References Cited

U.S. PATENT DOCUMENTS

| | | | |
|---|---|---|---|
| 2,917,125 A * | 12/1959 | Donner | B62D 5/09 |
| | | | 180/420 |
| 2,954,756 A * | 10/1960 | Donner | B62D 12/00 |
| | | | 180/420 |
| RE25,036 E * | 9/1961 | Donner | B62D 5/09 |
| | | | 180/405 |
| 3,014,548 A * | 12/1961 | Donner | B62D 12/00 |
| | | | 180/420 |
| 3,279,813 A * | 10/1966 | Linsay | B62D 7/1509 |
| | | | 180/410 |
| 3,712,403 A | 1/1973 | Pakosh | |
| 4,467,885 A | 8/1984 | Furukawa et al. | |
| 4,669,745 A * | 6/1987 | Miki | B62D 7/1536 |
| | | | 180/410 |
| 7,014,008 B2 | 3/2006 | Furumi et al. | |
| 7,308,964 B2 | 12/2007 | Hara et al. | |
| 8,030,873 B2 | 10/2011 | Wilson et al. | |
| 8,205,897 B2 | 6/2012 | Avigni | |

(Continued)

*Primary Examiner* — Joseph M Rocca
*Assistant Examiner* — Conan D Duda
(74) *Attorney, Agent, or Firm* — Michael Best & Friedrich LLP

(57) ABSTRACT

The present invention provides a power assist steering system for a vehicle having a wheel. The steering system includes a first reciprocating member coupled to the wheel such that reciprocating movement of the first reciprocating member provides turning movement of the wheel, a steering input engaged with the first reciprocating member such that rotation of the steering input provides reciprocating movement of the first reciprocating member, and a steering assist assembly including a second reciprocating member engaged with the steering input such that reciprocating movement of the second reciprocating member provides an assist force to the steering input. Preferably, the first and second reciprocating members engage the steering input at locations opposed to each other and also move along paths that are substantially parallel to each other.

16 Claims, 7 Drawing Sheets

(56) References Cited

U.S. PATENT DOCUMENTS

| | | | |
|---|---|---|---|
| 8,434,585 B2 | 5/2013 | Fujitomi et al. | |
| 8,517,135 B2 | 8/2013 | Schapf et al. | |
| 8,636,093 B2 * | 1/2014 | Sotoyama | B62D 21/152 |
| | | | 180/312 |
| 2006/0231323 A1 * | 10/2006 | Rosenfeld | B62D 5/22 |
| | | | 180/428 |
| 2006/0278466 A1 * | 12/2006 | Cheng | B62D 5/04 |
| | | | 180/444 |
| 2010/0326762 A1 | 12/2010 | Avigni | |

* cited by examiner

DUAL BORE INTEGRATED STEERING ASSIST

BACKGROUND

The present invention relates generally to vehicle steering assemblies, and particularly to steering assemblies having power assistance.

Most four-wheeled vehicles, such as utility task vehicles ("UTVs"), have a means for turning the front wheel in order to control the direction of travel of the vehicle. For example, it is known to provide such means for turning with a rack and pinion system. In such a system, a steering wheel is coupled to a pinion that drives a rack that provides rotational movement of the vehicle wheels.

Some rack-and-pinion steering systems further include a system for assisting with steering forces, often called steering assist. For example, an additional pinion can be engaged with the rack and can be provided with torque to assist with steering input to the rack. Alternatively, a linear actuator, such as a piston-cylinder assembly, can be coupled to the rack to provide the desired steering assist force.

SUMMARY

The present invention provides a power assist steering system for a vehicle having a turnable wheel. The steering system includes a first reciprocating member (e.g., a toothed steering rack) coupled to the turnable wheel such that reciprocating movement of the first reciprocating member provides rotational movement of the turnable wheel, a steering input (e.g., a toothed steering pinion) engaged with the first reciprocating member such that rotation of the steering input provides reciprocating movement of the first reciprocating member, and a steering assist assembly including a second reciprocating member engaged with the steering input such that reciprocating movement of the second reciprocating member provides an assist force to the steering input.

Preferably, the steering system further includes a housing having a bore in which the second reciprocating member can reciprocate, and fluid ports that facilitate transfer of fluid into the bore such that the housing and second reciprocating member cooperatively define an active cylinder-piston assembly. Seals can be provided on the ends of the second reciprocating member to inhibit fluid leakage. The housing can further include a cutout in communication with the bore to facilitate access to the second reciprocating member. The steering input can be positioned in the cutout to facilitate engagement of the steering input with the second reciprocating member. In one embodiment, the housing has another bore in which the first reciprocating member can reciprocate. Preferably, the first and second reciprocating members engage the steering input at locations opposed to each other and also move along paths that are substantially parallel to each other.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
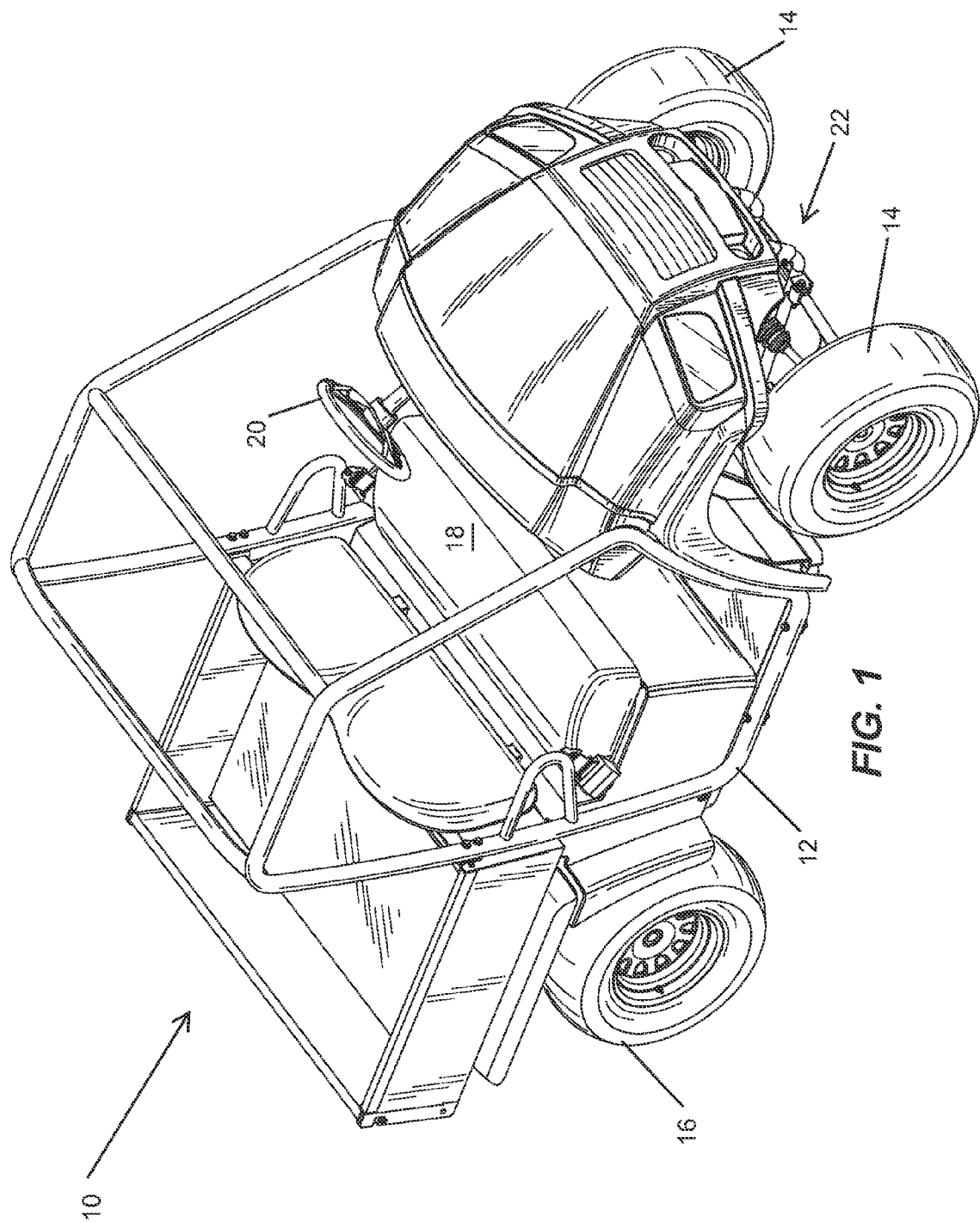
FIG. 1 is a perspective view of a UTV having a steering assembly embodying the present invention.
Figure 2:
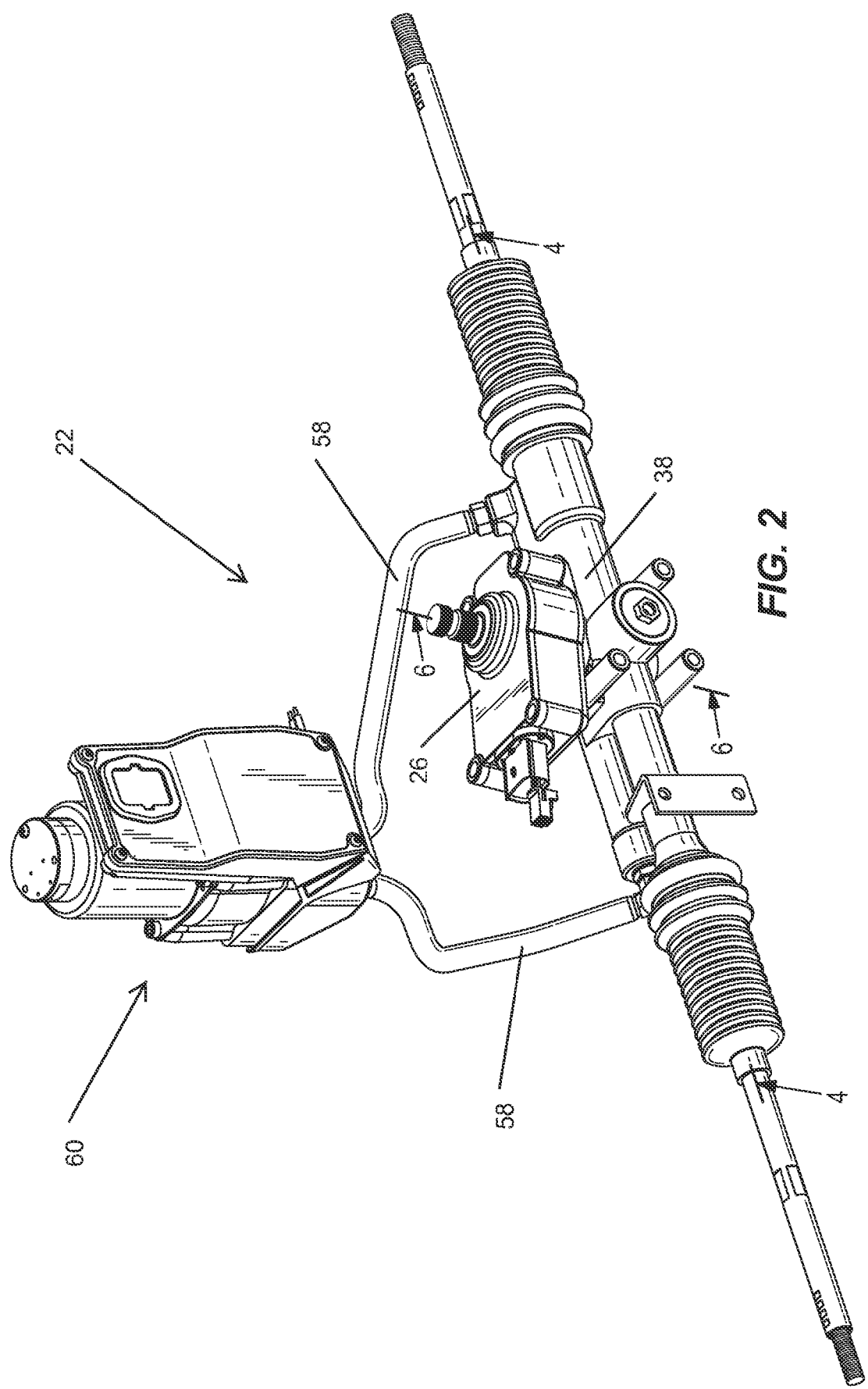
FIG. 2 is an enlarged perspective view of the steering assembly from the UTV of FIG. 1.
Figure 3:
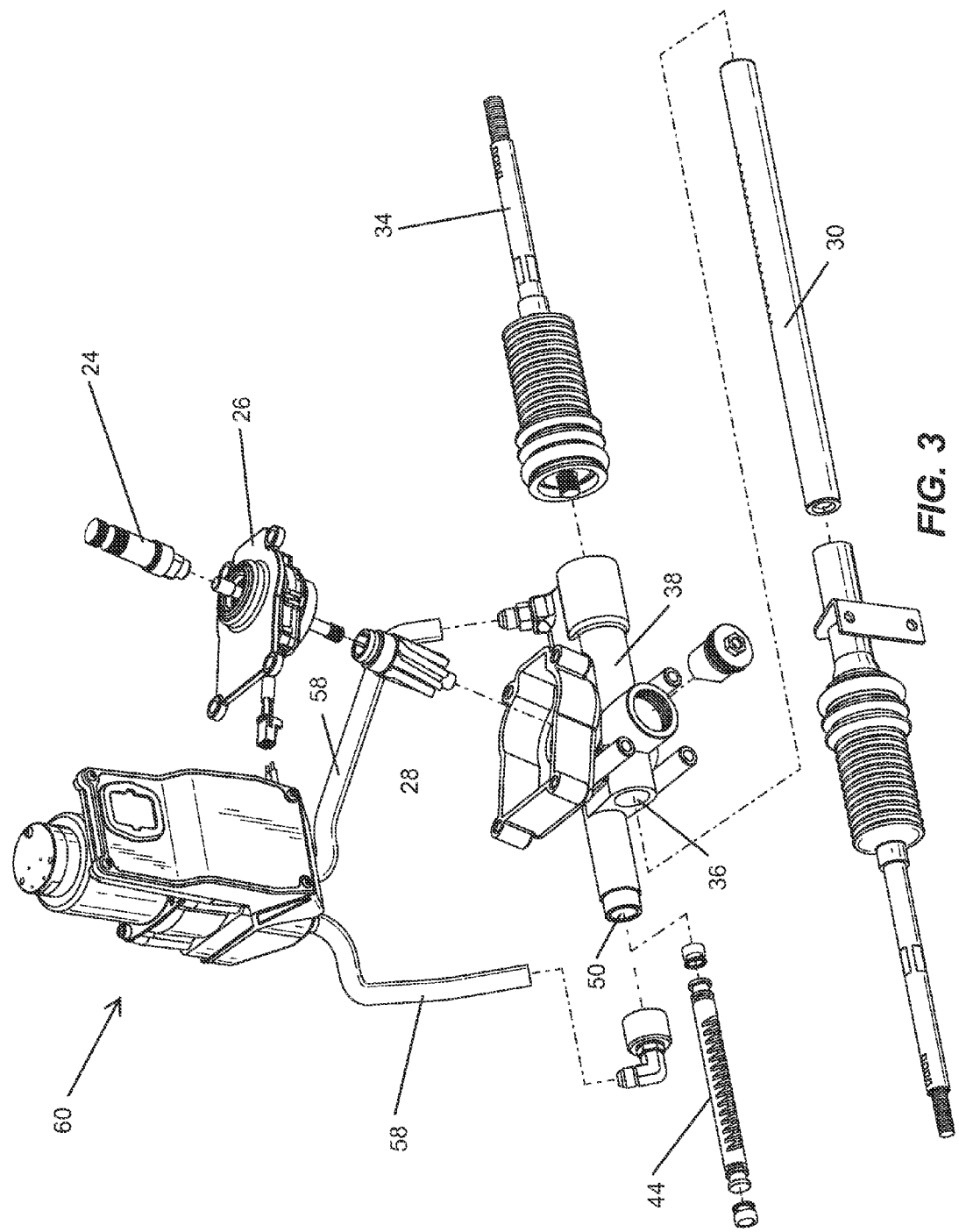
FIG. 3 is a partially exploded view of the steering assembly of FIG. 2.
Figure 4:
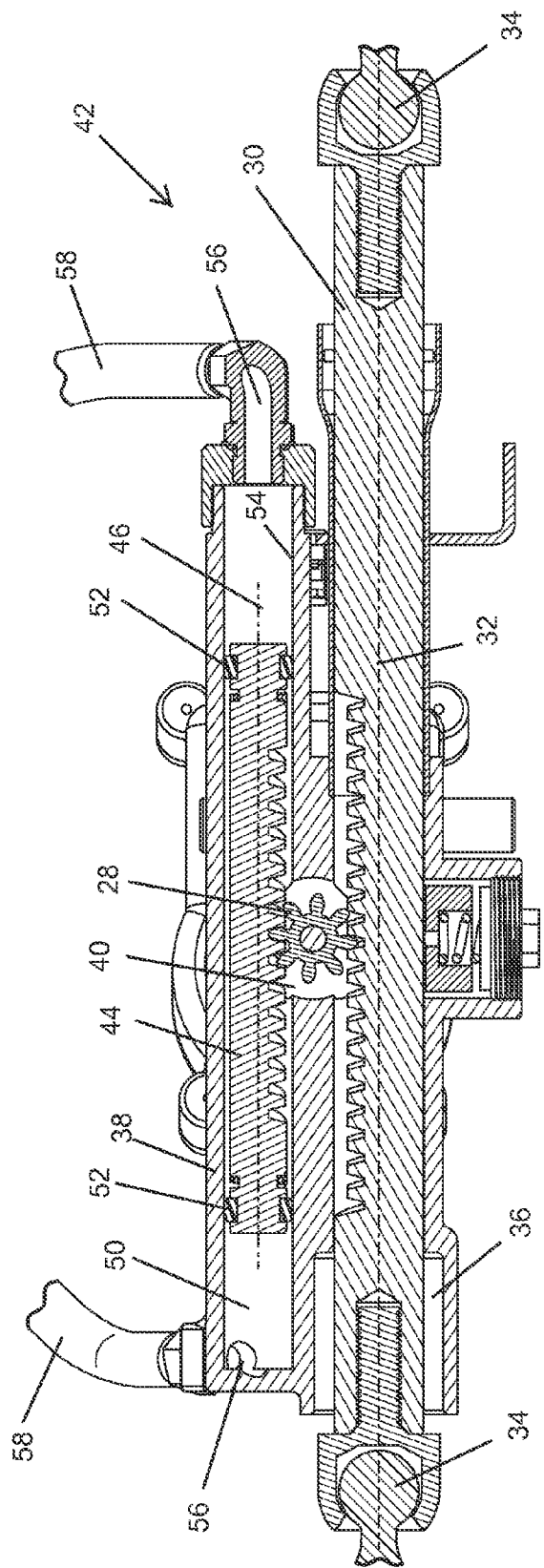
FIG. 4 is a section view taken along line 4-4 in FIG. 2 with the steering assembly in a centered position.
Figure 5:
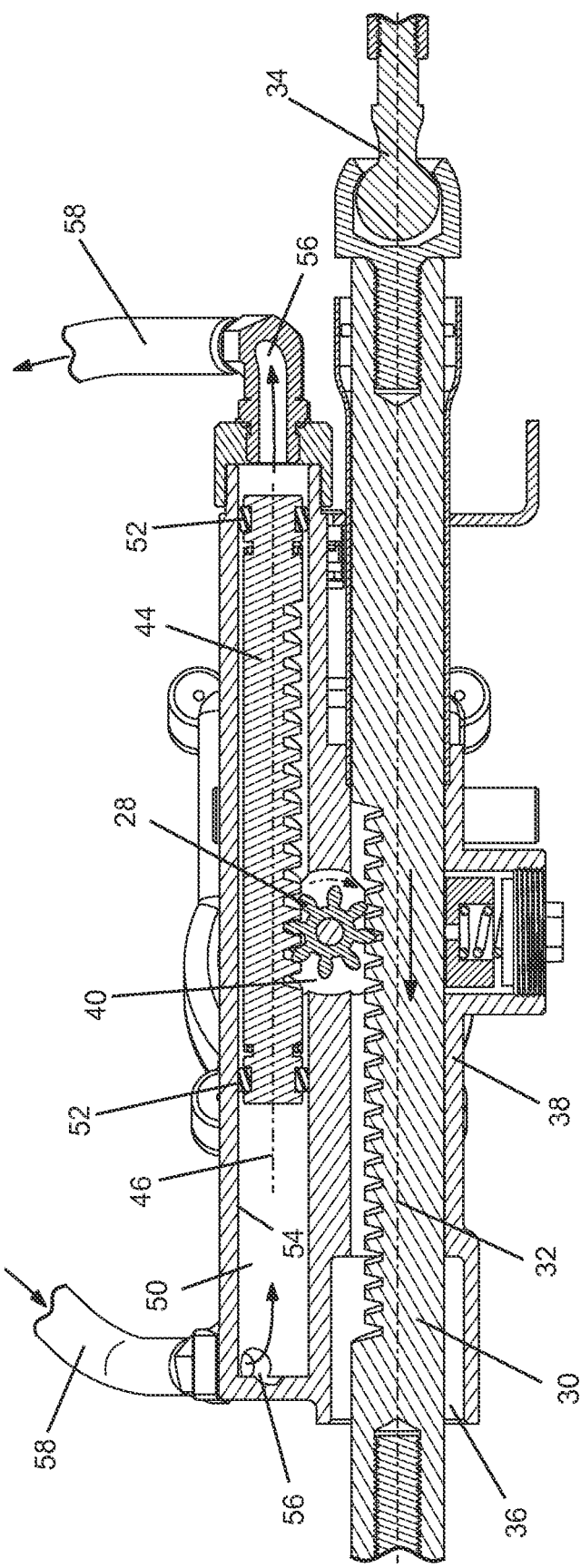
FIG. 5 is the section view of FIG. 4 with the steering assembly in a turned position.
Figure 6:
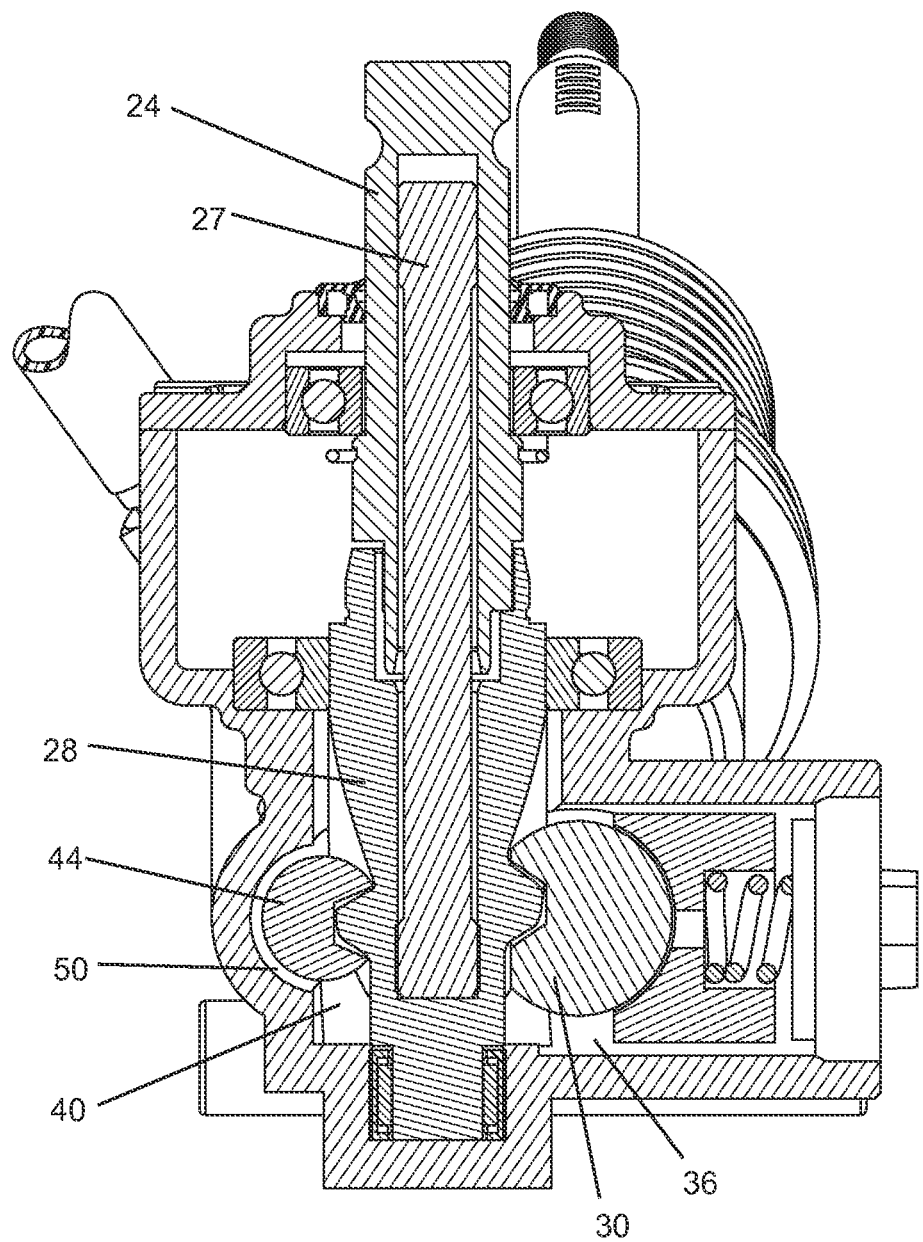
FIG. 6 is a section view taken along line 6-6 in FIG. 2.

FIG. 1 illustrates a UTV 10 having a frame 12, four wheels 14,16 supporting the frame 12, and a seat 18 supported by the frame 12. The two front wheels 14 are mounted such that they can turn in order to facilitate steering of the UTV 10 via a steering wheel 20.

Figure 7:
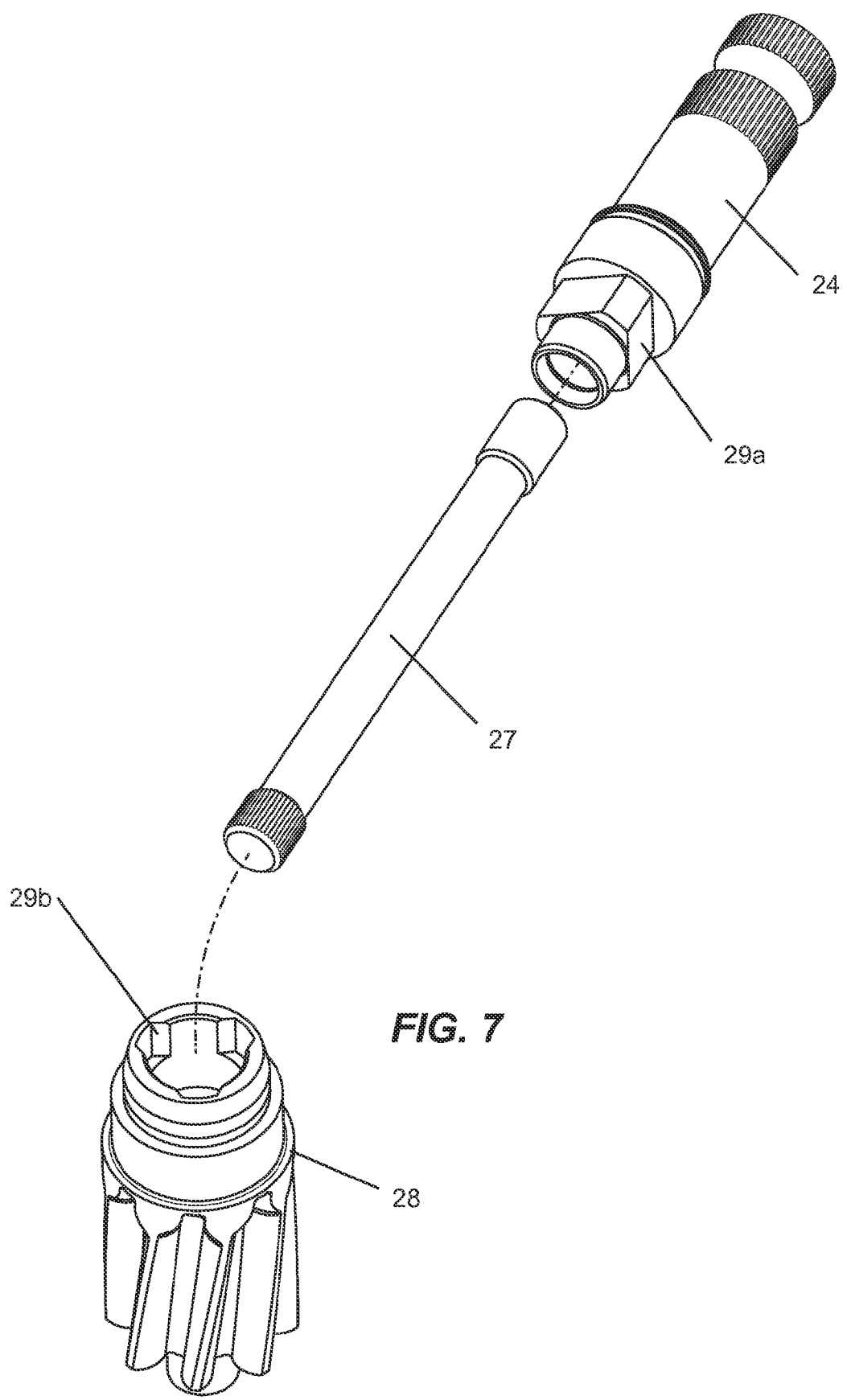
FIG. 7 is an exploded perspective view of a steering shaft, torsion bar, and pinion.

Referring to FIGS. 2-6, a rack-and-pinion steering assembly 22 is coupled between the steering wheel 20 and the front wheels 14. The steering assembly 22 includes a steering shaft 24 coupled for rotation with the steering wheel 20, a steering sensor 26 that measures steering parameters (e.g., steering angle and torque), a torsion bar 27 coupled on a first end to the steering shaft 24, and a toothed pinion 28 coupled for rotation with a second end of the torsion bar 27. In this regard, is can be seen that the torsion bar 27 transmits torque from the steering shaft 24 to the pinion 28. However, there is some overlap between the steering shaft 24 and the pinion 28, and this overlap includes a rotational lost motion feature 29a, 29b (see FIG. 7) that will limit mechanical rotation of the pinion 28 relative to the steering shaft 24 in the event of an extreme steering event or failure of the torsion bar 27.

The toothed pinion 28 is engaged with a toothed steering rack 30 that can be reciprocated transversely along a first path 32 to turn the front wheels 14 via tie rods 34, as is generally known in the art. The steering rack 30 is supported in a first bore 36 in a housing 38 that is supported by the frame 12. The pinion 28 is positioned in a cutout 40 in the housing 38, the cutout 40 being in communication with the first bore 36 in order to facilitate engagement of the pinion 28 with the steering rack 30.

The steering assembly 22 further includes a steering assist 42 that can provide a force to assist movement of the steering rack 30. The present invention focuses on the structure that provides the steering assist 42 and not on the methods or algorithms for determining when and how much to assist. Such methods and algorithms utilize inputs, such as steering torque, vehicle speed, and steering angle, to calculate when and how much to provide steering assist and are beyond the scope of this invention.

The steering assist 42 includes an assist rack 44 in engagement with the pinion 28 at a location opposite to the engagement of the pinion 28 with the steering rack 30 (i.e., the assist rack 44 and steering rack 30 engage the pinion 28 on opposing sides of the pinion 28 from each other). The assist rack 44 can be reciprocated transversely along a second path 46 parallel to the first path 32 to provide an assist force to the pinion 28. This assist force is provided by power steering fluid that is pumped into engagement with an end of the assist rack 44, as described below in more detail.

It is noted that the teeth of the pinion 28 are symmetrical such that both the steering rack 30 and the assist rack 44 are engaged and driven by the same tooth profile.

The assist rack 44 is positioned for reciprocation in a second bore 50 in the housing 38. Like the first bore 36, the second bore 50 is in communication with the cutout 40 in order to facilitate engagement of the pinion 28 with the assist rack 44. Each end of the assist rack 44 is provided with a fluid seal 52 that seals against an inner surface 54 of the second bore 50 to inhibit the passage of fluid. Each end of the second bore 50 includes a fluid port 56 that is coupled to fluid lines 58 to facilitate the exchange of power steering fluid to and from a power steering pump 60. In this regard, the assist rack 44 and housing 38 function as an active piston-cylinder assembly that can convert fluid pressure to an assist force on the pinion 28.

If desired, coil return springs (not shown) can be positioned inside the second bore 50, one between each end of the assist rack 44 and the corresponding end of the housing 38 to provide a centering bias to the assist rack 44. Resilient stoppers (not shown) can also be positioned inside the second bore 50, one between each end of the assist rack 44 and the corresponding end of the housing 38 to absorb the bottoming force at the end of travel on both ends of the assist rack 44.

In operation, when it is determined that power steering assistance is desired, the power steering pump 60 provides pressurized power steering fluid to one side of the second bore 50 via the corresponding fluid port 56. Such pressurized fluid provides a fluid force on the pressurized end of the assist rack 44, and fluid is substantially prevented from leaking into the cutout 40 by virtue of the fluid seal 52 on the pressurized end of the assist rack 44. The fluid force results in the assist rack 44 providing an assist force on the pinion 28, which results in a corresponding assist force from the pinion 28 to the steering rack 30.

By virtue of the above-described arrangement, the power-assisted steering assembly is compact and can therefore be used on narrow vehicles with space problems.

Various features and advantages of the invention are set forth in the following claims.

The invention claimed is:

1. A vehicle comprising:
a base;
a wheel supporting the base and being rotationally moved relative to the base; a first reciprocating member coupled to the wheel such that reciprocating movement of the first reciprocating member provides turning movement of the wheel;
a steering input engaged with the first reciprocating member such that rotation of the steering input provides reciprocating movement of the first reciprocating member; and
a steering assist assembly including a second reciprocating member engaged with the steering input such that reciprocating movement of the second reciprocating member provides an assist force to the steering input; and
wherein the first reciprocating member comprises a toothed rack and the steering input comprises a toothed pinion enmeshed with the toothed rack and wherein the second reciprocating member comprises an assist rack enmeshed with the toothed pinion.

2. The vehicle of claim 1, wherein the vehicle comprises three additional wheels in addition to the wheel.

3. The vehicle of claim 1, wherein the steering assist further includes a housing defining a bore in which the second reciprocating member can reciprocate.

4. The vehicle of claim 3, wherein the housing includes a fluid port that facilitates transfer of fluid into the bore such that the housing and second reciprocating member cooperatively define an active cylinder-piston assembly.

5. The vehicle of claim 4, wherein the steering assist further includes a seal mounted on the second reciprocating member to inhibit the flow of fluid between the housing and the second reciprocating member.

6. The vehicle of claim 3, wherein the housing further includes a cutout in communication with the bore to facilitate access to the second reciprocating member by the steering input.

7. The vehicle of claim 6, wherein the steering input is positioned in the cutout.

8. The vehicle of claim 1, further comprising a housing having a first bore, a second bore, and a cutout coupling the first bore with the second bore, wherein the first reciprocating member is positioned in the first bore, the second reciprocating member is positioned in the second bore, and the steering input is positioned in the cutout.

9. The vehicle of claim 1, wherein the first and second reciprocating members reciprocate along paths that are substantially parallel to each other.

10. A steering assembly for a vehicle having a wheel, the steering assembly comprising:
a first reciprocating member adapted to be coupled to the wheel such that reciprocating movement of the first reciprocating member provides turning movement of the wheel;
a steering input engaged with the first reciprocating member such that rotation of the steering input provides reciprocating movement of the first reciprocating member; and
a steering assist assembly including a second reciprocating member engaged with the steering input such that reciprocating movement of the second reciprocating member provides an assist force to the steering input;
wherein the steering assist further includes a housing defining a bore in which the second reciprocating member can reciprocate; and
wherein the housing further includes a cutout in communication with the bore to facilitate access to the second reciprocating member by the steering input.

11. The steering assembly of claim 10, wherein the first reciprocating member comprises a toothed rack and the steering input comprises a toothed pinion enmeshed with the toothed rack, and wherein the second reciprocating member comprises an assist rack enmeshed with the toothed pinion.

12. The steering assembly of claim 10, wherein the housing includes a fluid port that facilitates transfer of fluid into the bore such that the housing and second reciprocating member cooperatively define an active cylinder-piston assembly.

13. The steering assembly of claim 12, wherein the steering assist further includes a seal mounted on the second reciprocating member to inhibit the flow of fluid between the housing and the second reciprocating member.

14. The steering assembly of claim 10, wherein the steering input is positioned in the cutout.

15. The steering assembly of claim 10, further comprising a housing having a first bore, a second bore, and a cutout coupling the first bore with the second bore, wherein the first reciprocating member is positioned in the first bore, the second reciprocating member is positioned in the second bore, and the steering input is positioned in the cutout.

16. The steering assembly of claim 10, wherein the first and second reciprocating members reciprocate along paths that are substantially parallel to each other.

\* \* \* \* \*